United States Patent
Kruglick

(10) Patent No.: US 9,022,688 B2
(45) Date of Patent: May 5, 2015

(54) SUBSURFACE INDUCED PORE CLOGGING TO PREVENT SPILL FLOW

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 43 days.

(21) Appl. No.: 13/129,531

(22) PCT Filed: Dec. 1, 2010

(86) PCT No.: PCT/US2010/058580
§ 371 (c)(1),
(2), (4) Date: May 16, 2011

(87) PCT Pub. No.: WO2012/074525
PCT Pub. Date: Jun. 7, 2012

(65) Prior Publication Data
US 2012/0141208 A1    Jun. 7, 2012

(51) Int. Cl.
*B09C 1/08*    (2006.01)

(52) U.S. Cl.
CPC ........................................ *B09C 1/08* (2013.01)

(58) Field of Classification Search
CPC .......................................................... B09C 1/08
USPC ................... 405/128.5, 128.7, 128.75, 129.2, 405/129.25, 129.6, 129.65; 210/747.7, 210/747.8, 748.01; 205/688, 766
See application file for complete search history.

(56) References Cited

U.S. PATENT DOCUMENTS

| | | | |
|---|---|---|---|
| 4,651,824 A | 3/1987 | Gradle | |
| 5,074,986 A | 12/1991 | Probstein et al. | |
| 5,240,570 A | 8/1993 | Chang et al. | |
| 5,476,992 A | 12/1995 | Ho et al. | |
| 5,520,482 A | 5/1996 | Oeste et al. | |
| 5,725,752 A * | 3/1998 | Sunderland et al. | 205/687 |
| 6,193,867 B1 * | 2/2001 | Hitchens | 204/515 |
| 6,326,187 B1 * | 12/2001 | Jones et al. | 435/262.5 |
| 6,576,116 B2 | 6/2003 | Carrigan et al. | |
| 7,060,136 B1 * | 6/2006 | Zeiher et al. | 134/18 |
| 2008/0032383 A1 * | 2/2008 | Yum | 435/252.5 |
| 2010/0209195 A1 * | 8/2010 | Shiau | 405/128.75 |

FOREIGN PATENT DOCUMENTS

| | | |
|---|---|---|
| CN | 2222913 Y | 3/1996 |
| CN | 1126450 A | 7/1996 |
| DE | 19924531 A1 | 11/2000 |
| JP | 90-047748 A | 2/1997 |
| WO | 9802600 A1 | 1/1998 |

OTHER PUBLICATIONS

Li, Z, et al, Electroremediation: Removal of heavy metals from soils by using cation selective membrane, Environmental Science & Technology, 1998, vol. 32, No. 3, pp. 394-397.

Kahn, J., Underground barrier: new technique to stop spread of contaminants from hazardous waste sites, Apr. 17, 1995 accessed online on Oct. 9, 2012 via http://www.lbl.gov/Science-Articles/Archive/underground-barrier.html.

(Continued)

*Primary Examiner* — Doug Hutton, Jr.
*Assistant Examiner* — Patrick Lambe
(74) *Attorney, Agent, or Firm* — Turk IP Law, LLC

(57) ABSTRACT

Implementations and techniques for providing subsurface permeation barriers are generally disclosed.

9 Claims, 8 Drawing Sheets

(56) References Cited

OTHER PUBLICATIONS

Ho, Sa V., et al., The lasagna technology for in situ soil remediation. 1. Small Field Test, Environmental Science & Technology, 1999, pp. 1086-1091, vol. 33, No. 7, American Chemical Society.

Ko, Seok-oh, et al., Cyclodextrin-enhanced electrokinetic removal of phenanthrene from a model clay soil, Environmental Science & Technology, Mar. 8, 2000, pp. 1535-1541, vol. 34, No. 8, American Chemical Society.

Ko, Seok-oh, et al., Partitioning of hydrophobic organic compounds to sorbed surfactants. 1. Experimental Studies, Environmental Science & Technology, Aug. 12, 1998, pp. 2769-2775, vol. 32, No. 18, American Chemical Society.

Ko, Seok-oh, et al., Partitioning of hydrophobic organic compounds to sorbed surfactants. 2. Model development/predictions for surfactant-enhanced remediation applications, Environmental Science & Technology, Aug. 12, 1998, pp. 2776-2781, vol. 32, No. 18, American Chemical Society.

Ko, Seok-oh, et al., Effects of solution chemistry on the partitioning of phenanthrene to sorbed surfactants, Environmental Science & Technology, Sep. 30, 1998, pp. 3542-3548, vol. 32, No. 22, American Chemical Society.

Ko, Seok-oh, et al., Partitioning of hydrophobic organic compounds to hydroxypropyl-β-cyclodextrin; experimental studies and model predictions for surfactant-enhanced remediation applications, Environmental Science & Technology, Jul. 3, 1999, pp. 2765-2770, vol. 33, No. 16, American Chemical Society.

Page, Mary M. and Christopher L. Page, Electroremediation of contaminated soils, Journal of Environmental Engineering, Mar. 2002, pp. 208-219, vol. 128, No. 3, accessed via http://www.aseanenvironment.info/Abstract/41013518.pdf on May 4, 2011.

Gardner, Kevin, Electrochemical remediation and stabilization of contaminated sediments, A Final Report Submitted to the NOAA/UNH Cooperative Institute for Coastal and Estuarine Environmental Technology (CICEET), Dec. 8, 2005, pp. 1-34, Durham, New Hampshire.

Rahman, Pattanathu K.S.M and Edward Gakpe, Production, characterisation and applications of biosurfactants-review, Biotechnology, 2008, pp. 360-370, vol. 7, No. 2, Asian Network for Scientific Information.

Rodriguez-Cruz, M.S., et al., Modification of clay barriers with a cationic surfactant to improve the retention of pesticides in soils, Journal of Hazardous Materials, Jan. 10, 2007, pp. 363-372, vol. 139, No. 2, Elsevier B.V.

Faulkner, D.W.S, et al., Electrokinetic generation of reactive iron-rich barriers in wet sediments: implications for contaminated land management, Mineralogical Magazine, Oct. 2005, pp. 749-757, vol. 69, No. 5, The Mineralogical Society.

Ahmad, H., et al., Waste containment by soil stabilization using electro-kinetic grouting method, International Containment Remediation Technology Conference, Orlando, Florida accessed on May 4, 2011 via http://www.containment.fsu.edu/cd/content/pdf/245.pdf.

Australian Patent Office, International Search Report and Written Opinion of the International Searching Authority, Mar. 10, 2011, pp. 1-14, Australia.

Foreign Office Action mailed Jul. 2, 2014 for Chinese Application No. 2010870221, "Subsurface induced pore clogging to prevent spill flow", with English Abstract.

* cited by examiner

400

```
┌─────────────────────────────────────┐
│ Provide surfactant material to a    │
│ subsurface soil volume              │
│                              402    │
└─────────────────────────────────────┘
                  │
                  ▼
┌─────────────────────────────────────┐
│ Acidify the subsurface soil volume  │
│                              404    │
└─────────────────────────────────────┘
```

FIG. 4

800 A computer program product.

802 A signal bearing medium.

804 at least one of one or more instructions for providing surfactant material to a subsurface soil volume;

one or more instructions for acidifying the subsurface soil volume;

one or more instructions for providing surfactant material adjacent to at least one of a cathode electrode or an anode electrode, wherein the cathode electrode and the anode electrode are configured to facilitate permeation of the surfactant material within the subsurface soil volumel;

one or more instructions for causing the surfactant material to permeate at least a portion of the subsurface soil volume;

one or more instructions for providing acidifying material adjacent to at least one of the cathode electrode or the anode electrode; or one or more instructions for causing the acidifying material to at least partially permeate the portion of the subsurface soil volume.

| 806 a computer-readable medium. | 808 a recordable medium. | 810 a communications medium. |

FIG. 8

SUBSURFACE INDUCED PORE CLOGGING TO PREVENT SPILL FLOW

CROSS-REFERENCE TO RELATED APPLICATIONS

The present application is the National Stage filing under 35 U.S.C. §371 of PCT Application No. PCT/US2010/058580, filed on Dec. 1, 2010. The disclosure of the PCT Application is hereby incorporated by reference in its entirety.

BACKGROUND

Unless otherwise indicated herein, the approaches described in this section are not prior art to the claims in this application and are not admitted to be prior art by inclusion in this section.

For environmental spills or contamination the first step is typically containment, even though it may take years for a pollutant to spread. Conventional spill containment typically involves digging a trench and filling the trench with clay material. Sometimes surface structures must be demolished or otherwise damaged to form the containment trenches. It might be useful to devise a spill containment response that leverages electro-remediation techniques in order to avoid damage to surface structures while still impeding the spread of harmful pollution.

SUMMARY

In accordance with some implementations, methods for method for forming subsurface permeation barriers may generally include providing surfactant material to a subsurface soil volume and acidifying the subsurface soil volume. For instance, surfactant material may be provided to a cathode module or an anode module, where the cathode module and the anode module have been arranged to provide permeation of the surfactant material within a subsurface soil volume. The surfactant material may then be caused to permeate at least a portion of the subsurface soil volume. Acidifying material may also be provided to the cathode module and/or the anode module. The acidifying material may then be caused to permeate the portion of the subsurface soil volume.

In accordance with some implementations, pollution containment systems are generally described that may include multiple electrodes and a subsurface permeation barrier including at least one barrier segment extending between two of the electrodes. The barrier segment may include surfactant adhered material.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The subject matter of the present disclosure is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 4 is a flow diagram illustrating an example process;

FIG. 8 is an illustration of an example computer program product; and

DETAILED DESCRIPTION

Figure 1:
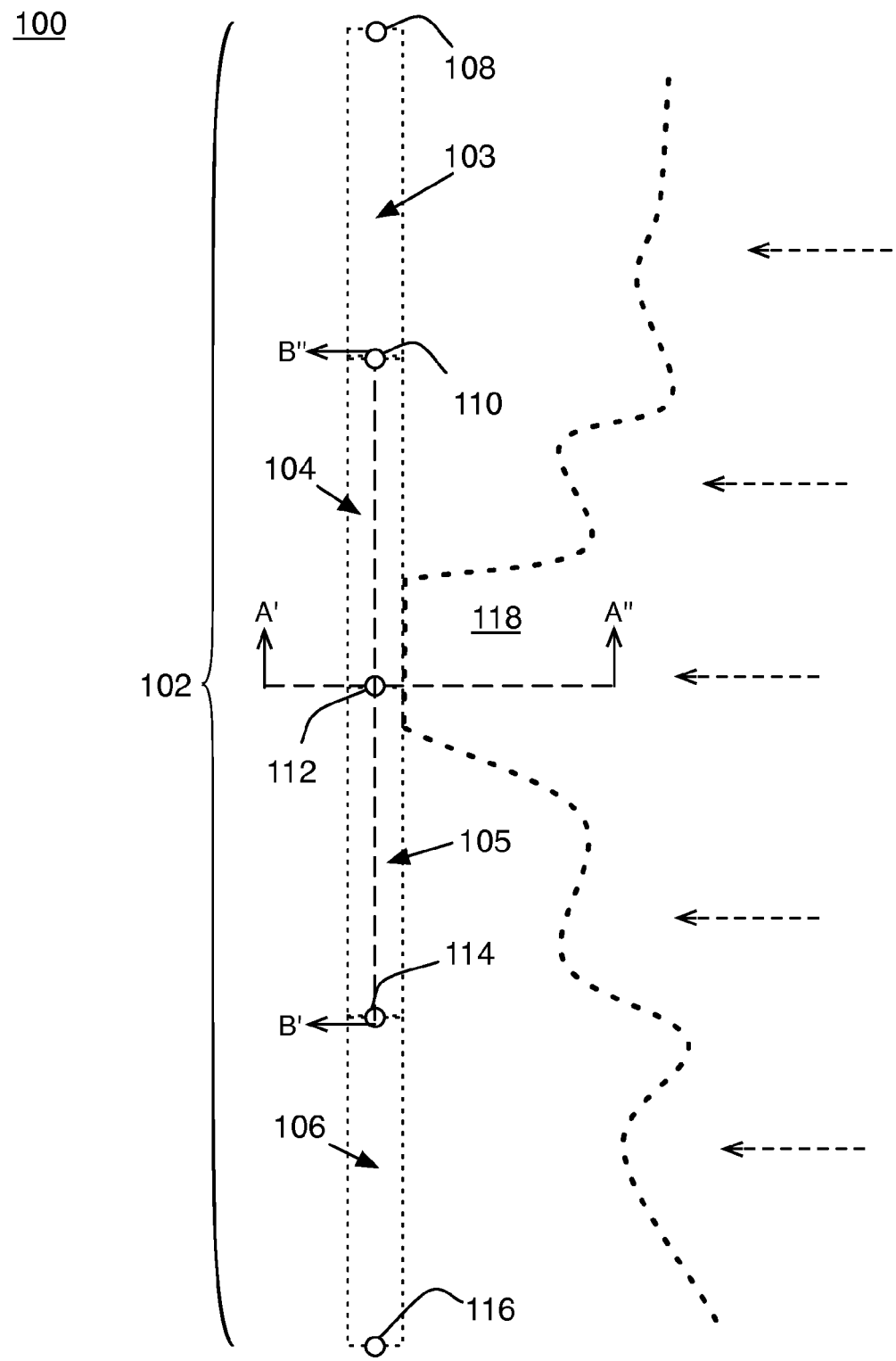
FIG. 1 is an illustrative diagram of an example system.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the embodiments of the present disclosure, as generally described herein, and illustrated in the Figures, can be arranged, substituted, combined, and designed in a wide variety of different configurations, all of which are explicitly contemplated and make part of this disclosure.

This disclosure relates to methods, apparatus, and systems generally related to the containment of underground pollution sources and more particularly to the in situ formation of underground permeation barriers.

In accordance with various implementations of the present disclosure, electro-remediation equipment such as arrangements of electro-remediation electrode structures may be used to generate an in ground permeation barrier with the ability to substantially prevent permeation of subsurface contaminants through the barrier. In some examples an underground area or region may be permeated with a basic (high pH) and/or buffered surfactant solution and the barrier structure may then be formed in situ by subsequently permeating that region with an aqueous solution, an un-buffered solution and/or an acidic (low pH) solution to cause the surfactant to adhere to soil particles in the region. In some examples an underground region may be permeated with a buffered and/or acidic solution surfactant solution and the barrier structure may then be formed in situ by subsequently permeating that region with a buffered and/or basic surfactant solution to cause the surfactant to adhere to soil particles in the region.

Electro-remediation techniques may be employed to effect the movement and/or permeation of chemical compounds, including surfactants, buffer, acid and/or base compounds, within a subsurface soil volume. The transport or permeation of such materials through the soil volume may take place by electro-osmosis, electro-migration and/or electrophoresis. Soil material may include gravel, sand, silt and/or clay material.

FIG. 1 illustrates a top down view of an example pollution containment system 100 in accordance with at least some embodiments of the present disclosure. System 100 includes a subsurface pollution containment dike or permeation barrier 102 having barrier segments 103, 104, 105 and 106. Permeation barrier 102 is associated with electrode modules 108, 110, 112, 114 and 116 that may be, in some implementations, components of an electro-remediation system. Electrode modules 108, 110, 112, 114 and 116 may be configured to facilitate permeation of surfactant material within a subsurface soil volume corresponding, at least in part, to barrier 102. Individual barrier segments 103, 104, 105 and 106 may be associated with electrode modules pairs 108/110, 110/112, 112/114 and 114/116 respectively.

As will be described in greater detail below, barrier 102 may be formed in situ to control pollution by, for example, inhibiting a pollution plume 118 (shown in FIG. 1 as flowing from right to left) from passing through barrier 102. Barrier 102 may include surfactant adhered soil material formed from surfactant molecules that have undergone sorption to soil particles within the barrier volume. The surfactant adhered soil material of barrier 102 may inhibit the flow of plume 118 by at least partially blocking soil pores within barrier segments 103, 104, 105 and/or 106.

Figure 2:
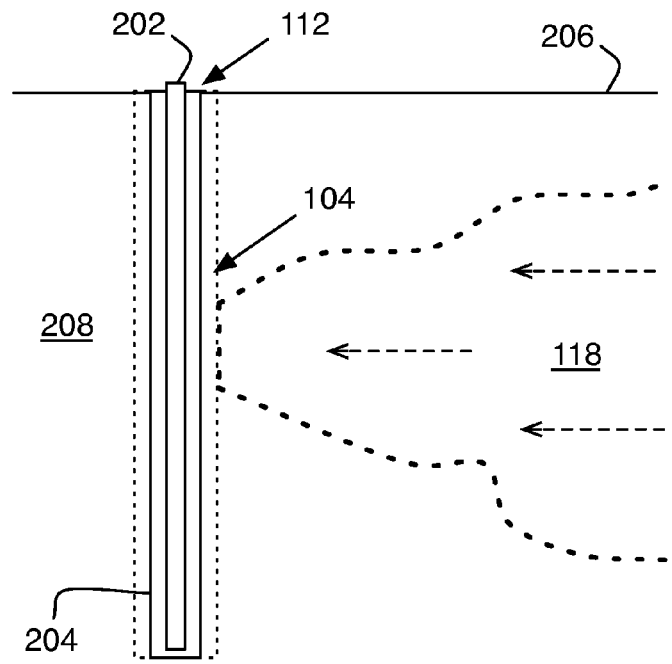
FIG. 2 is an illustration of a portion of the example system of FIG. 1.

FIG. 2 illustrates an elevational side view of portions of example system 100 taken along transect A'-A" as illustrated in FIG. 1 in accordance with at least some embodiments of the present disclosure. As shown in FIG. 2, electrode module 112 includes an electrode 202 positioned in an electrode reservoir or well 204. As previously noted, electrode module 112 may be part of an electro-remediation system. Electrode module 112 may be positioned such that it extends from soil surface 206 downward into subsurface soil 208 such that barrier segment 104 may be formed in a location suitable to at least partially contain the flow of plume 118.

Figure 3:
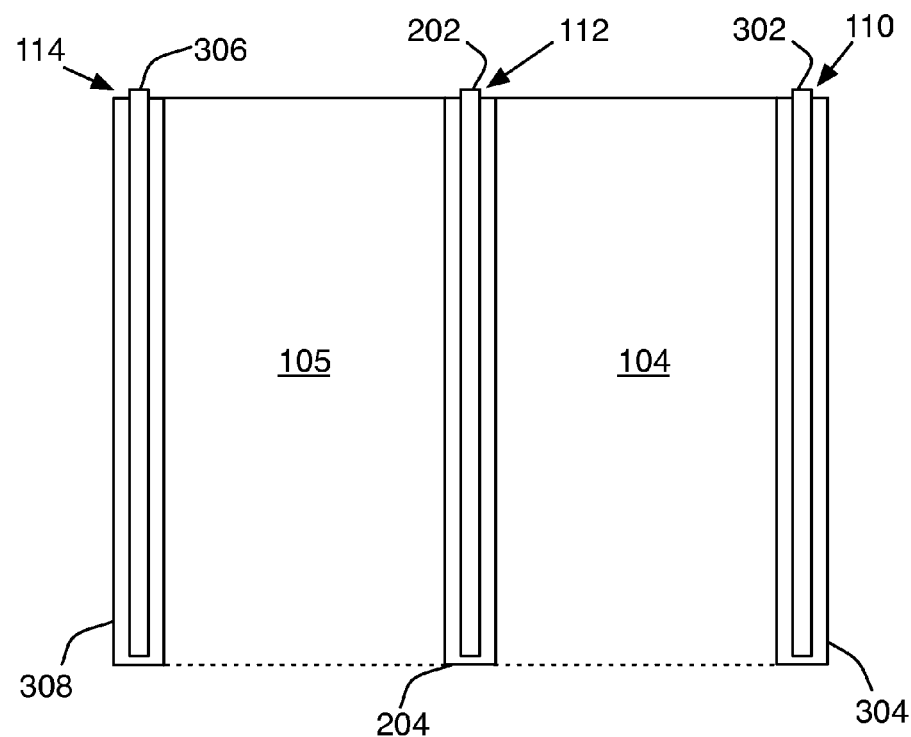
FIG. 3 is an illustration of a portion of the example system of FIG. 1.

FIG. 3 illustrates another elevational side view of portions of example system 100 taken along transect B'-B" as illustrated in FIG. 1 in accordance with at least some embodiments of the present disclosure. As shown in FIG. 3, electrode modules 110, 112 and 114 include respective electrodes 302, 202 and 306 positioned in corresponding electrode wells 304, 204 and 308. In various implementations, any one of electrodes 202, 302 and/or 306 may be a cathode electrode or an anode electrode. In certain embodiments, adjacent electrodes may be the same or different in type, that is, an anode electrode can be adjacent to a cathode electrode, or adjacent to another anode electrode. For example, electrode 202 may be a cathode electrode and electrodes 302 and 306 may be anode electrodes. In another example, electrode 202 may be an anode electrode and electrodes 302 and 306 may be cathode electrodes.

In various implementations, an electrode, such as electrode 202 of electrode module 112, may be formed from conductive material. In some non-limiting examples, an electrode may be formed from metallic materials such as copper, stainless steel, activated titanium, iron etc and/or from non-metallic conductive material such as graphite. In various non-limiting examples, an electrode may be formed from a conductive metal such as copper that has been coated with another material such as a conductive ceramic. In some non-limiting examples, an electrode well, such as electrode well 204, may be any type of structure, such as a porous casing structure, that may accept solutions including dissolved chemical compounds and may permit those solutions to pass between the interior of the electrode well and the surrounding soil.

Placement of electrode modules 108, 110, 112, 114 and 116 may depend on soil type, soil density and/or pore size, thus, prior to forming barrier 102, subsurface soil 208 may be tested using known techniques to characterize permeation rates for various materials. Such techniques may be employed to determine the separation between electrodes. Generally, the separation between electrodes may be any distance. In some non-limiting examples, the separation between electrodes may be about 10-30 meters resulting in barrier segments 103, 104, 105 and 106 having corresponding lengths of about 10-30 meters and having widths of about 30 cm. The separation between adjacent electrodes may be uniform in distance, or variable in distance.

FIG. 4 illustrates a flow diagram of an example process 400 according to various implementations of the present disclosure. Process 400 may include one or more operations, functions or actions as illustrated by one or more of blocks 402 and/or 404. Process 400 may begin at block 402.

At block 402, surfactant material may be provided to a subsurface soil volume. In some examples, referring also to FIGS. 1-3, block 402 may involve providing a solution of surfactant material to one or more of electrode modules 108, 110, 112, 114 and 116 and then employing known electro-remediation electrokinetic techniques to cause the surfactant material to permeate a subsurface soil volume located between two or more electrode modules. For instance, a soil volume corresponding to barrier segment 104 may be permeated by surfactant material by placing a solution of surfactant material in electrode well 204, adjacent to electrode 202, and configuring electrodes 202 and 302 as a cathode/anode pair of an electro-remediation system. Surfactant material may then be caused to permeate through at least portions of the subsurface soil volume by applying an electric field between the cathode/anode electrode pair.

A surfactant solution employed at block 402 may include one or more surfactant compounds added to an aqueous solution. For instance, in various non-limiting examples surfactant may be added to water at a concentration of 1-2 grams per liter although specific types of surfactant compounds and/or concentrations of surfactant compounds employed may depend on specific soil types and/or conditions. In some examples, the surfactant material may be provided to the subsurface soil volume in a basic and/or buffered solution. For instance, in various non-limiting examples surfactant material may be provided in the form of a pH buffered solution, for example, a solution containing surfactant compounds that has been buffered to a neutral or basic pH using electrolytes such as NaCl, $Na_2CO_3$, etc. For instance, a solution employed at block 402 may include surfactant compounds dissolved in a 0.003 M $Na_2CO_3$ solution. Alternatively, the surfactant material employed at block 402 may be provided without a solvent or not in solution. This may be convenient when the subsurface soil volume already contains water sufficient to dissolve the surfactant material or when the subsurface soil volume is already saturated with water. The surfactant material may be provided to the subsurface soil volume all at once, in separate portions, or continuously over time.

In accordance with the present disclosure, various surfactant compounds and/or combinations of surfactant compounds may be employed at block 402. In various implementations, anionic, non-ionic, cationic and/or amphoteric surfactants may be employed. For example, surfactants such as, but not limited to, hydroxypropyl beta cyclodextrin (HPCD), polysorbate 80, trimethylammonium bromide, cetyltrimethylammonium bromide, tetradecyltrimethylammonium bromide, octadecyltrimethylammonium bromide, polyacrylamide, methyl cellulose, dioctyl sulfonate, diphenyl oxide disulfonate, polyoxyalkylated fatty acid ester and/or a sodium dodecyl sulfate may be employed.

Further, in various implementations, surfactant material employed at block 402 may include biodegradable surfactants and/or biosurfactants. For example, biosurfactants such as, but not limited to, trehalolipids, rhamnolipids, sophorolipids, glycolipids, diglycosyl diglycerides, surfactin, liposan and/or emulsan may be employed. In addition, surfactant material employed at block 402 may include coating and/or binding polymeric material such as, but not limited to, polysiloxanes.

In implementing block 402 various direct current (DC) voltages may be placed across two or more electrodes. For instance, in various non-limiting examples, voltages of between about 100 volts and about 10,000 volts may be applied to the electrodes, although electrical conditions employed may depend on specific soil types and/or conditions. In some examples, block 402 may be undertaken using pulsed DC voltages. For instance, in a non-limiting example, DC voltage pulses of one second in duration may be applied every ten seconds over a span of three to seven days during which surfactant molecules may be electro-osmotically transferred into the subsurface soil volume.

Process 400 may continue with the acidification of the subsurface soil volume at block 404. In various implementations, block 404 may involve providing an acidic or low pH solution adjacent to the same electrode employed at block 402. In other implementations, the acidic or low pH solution may be provided adjacent to another electrode. For instance, if surfactant has been caused to permeate subsurface soil volume 105 at block 402 by, in part, providing surfactant material to electrode well 204, block 404 may involve providing an acidic or low pH solution to either electrode well 204 or electrode well 308. The acidic or low pH solution may then be caused to permeate and thereby acidify at least portions of the subsurface soil volume by applying an electric field between the cathode/anode electrode pair. Similar electrical conditions to those previously described may be employed. The acidification may be performed all at once, in separate portions, or continuously over time.

In some implementations, the un-buffered and/or acidic solutions employed at block 404 may include un-buffered and/or acidic surfactant solutions having the same and/or different surfactant compounds employed at block 402. For instance, block 402 may involve using a buffered HPCD solution to permeate the subsurface soil volume with HPCD and block 404 may involve using an un-buffered HPCD solution to cause acidification of that subsurface volume resulting in the formation of HPCD adhered soil within that subsurface volume. In various other implementations, the un-buffered and/or acidic solutions may also be aqueous acidic solutions including hydrochloric, sulfuric, and/or acetic acid solutions to name just a few non-limiting examples.

While process 400 has been described above as involving the implementation of block 402 followed by the implementation of block 404, claimed subject matter is not limited in this regard and block 404 may be implemented before, during or after block 402. For instance, in some implementations, block 404 may be undertaken by, for example, causing an acidic solution to permeate a subsurface soil volume resulting in acidification of the soil volume. Subsequently, block 402 may be undertaken by causing a high pH or buffered surfactant solution to permeate the same soil volume resulting in the formation of surfactant adhered soil within that subsurface volume. In addition, in some implementations, block 402 and/or block 404 may be implemented multiple times to form a permeation barrier in accordance with the present disclosure. For example, blocks 402 and 404 may be followed by another iteration of block 402 and/or another iteration of block 404.

Figure 5:
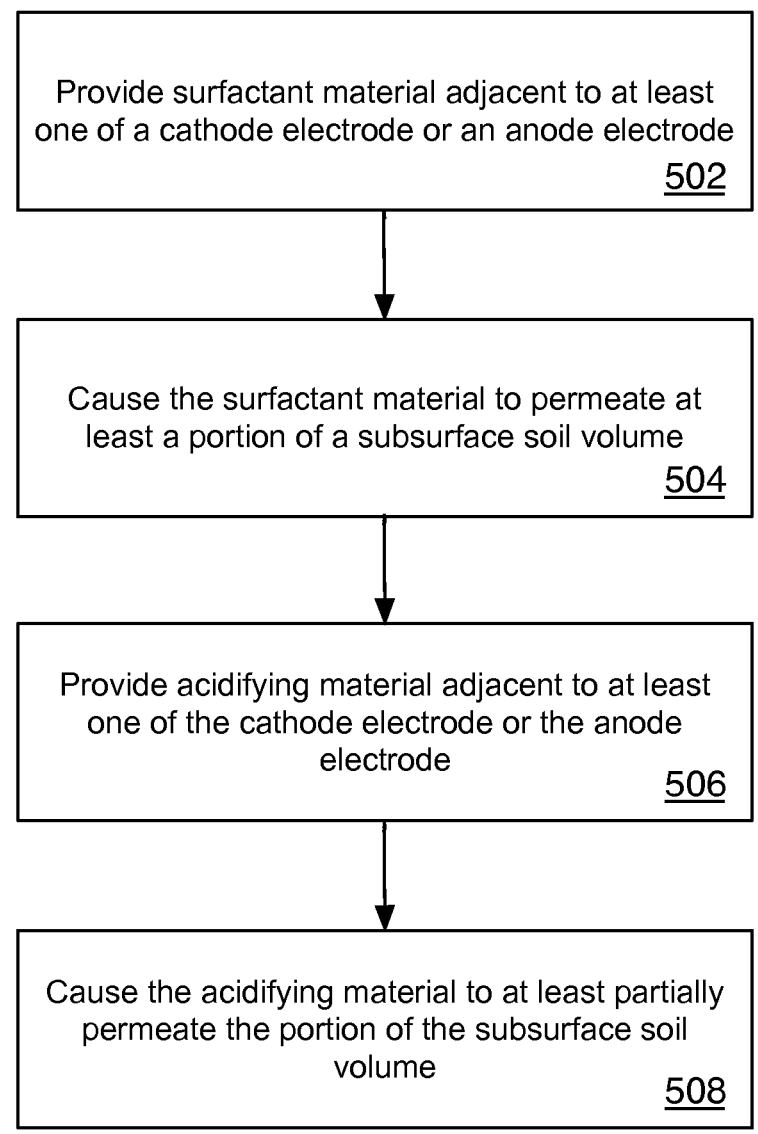
FIG. 5 is a flow diagram illustrating another example process.

FIG. 5 illustrates a flow diagram of an example process 500 according to various implementations of the present disclosure. Process 500 may include one or more operations, functions or actions as illustrated by one or more of blocks 502, 504, 506 and/or 508. Process 500 may begin at block 502.

At block 502, surfactant material may be provided adjacent to at least one of a cathode electrode or an anode electrode. In some examples, referring also to FIGS. 1-3, block 502 may involve providing a solution of surfactant material, such as a buffered HPCD solution, to one or more of electrode modules 108, 110, 112, 114 and 116. At block 504, the surfactant material may be caused to permeate at least a portion of a subsurface soil volume. For instance, electro-remediation techniques may be employed to cause HPCD surfactant to permeate a subsurface soil volume located between two or more of electrode modules 108, 110, 112, 114 and 116.

At block 506, acidifying material may be provided adjacent to at least one of the cathode electrode or anode electrode and, at block 508, the acidifying material may be caused to permeate the portion of the subsurface soil volume permeated by surfactant material at block 504. For instance, if a buffered HPCD solution has been provided to electrode module 112 at block 502, and the HPCD material has been caused to permeate at least a portion of soil volume corresponding to barrier segments 104 and/or 105 at block 504, then blocks 506 and 508 may involve providing an un-buffered or acidic solution to one or more of electrode modules 110, 112 and/or 114 and then causing the un-buffered or acidic solution to permeate the soil volume corresponding to barrier segments 104 and 105.

Figure 6:
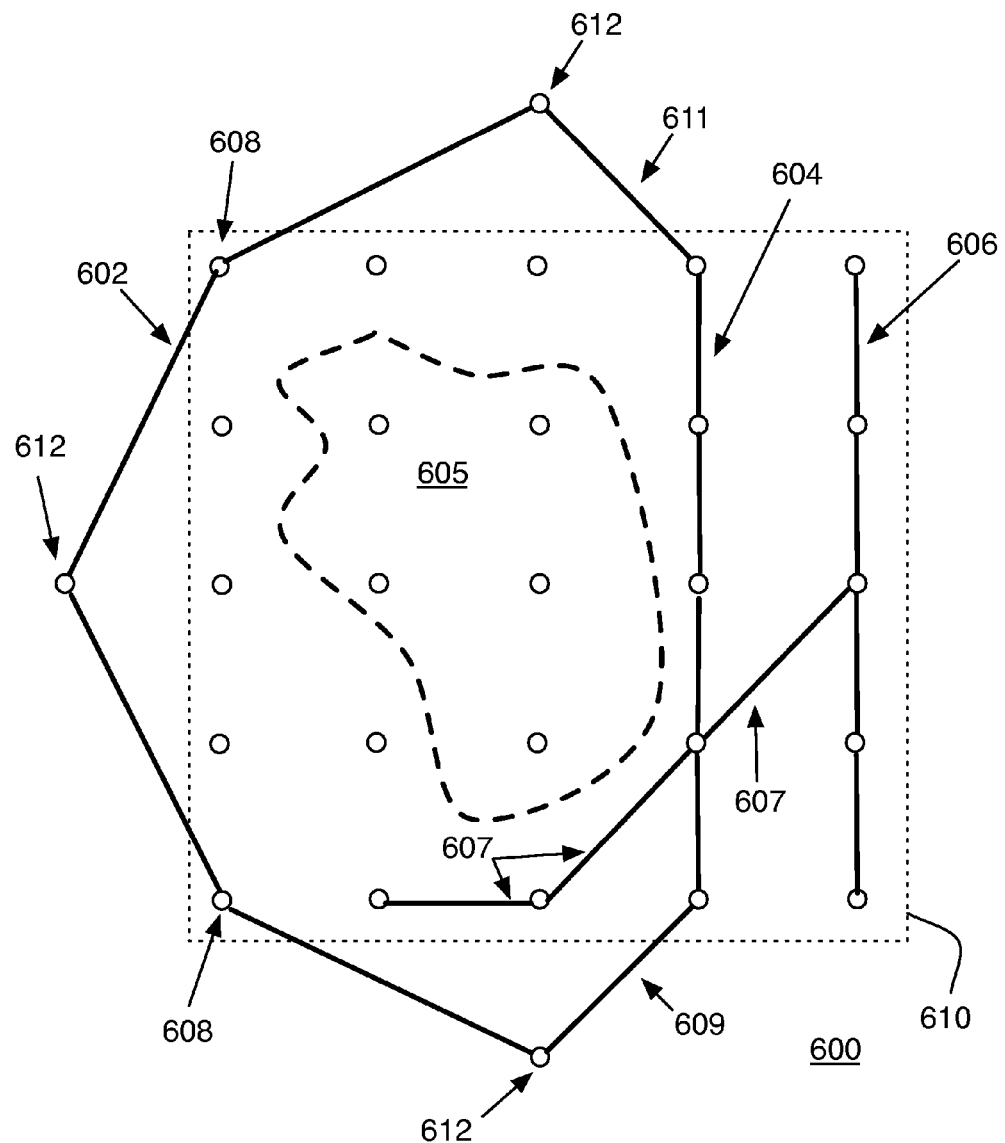
FIG. 6 is an illustrative diagram of another example system.

FIG. 6 illustrates portions of another example pollution containment system 600 in accordance with at least some embodiments of the present disclosure. System 600 includes four example permeation barriers 602, 604, 606 and 607 that may be implemented to contain a pollution plume 605. Barrier 602 may have been formed, employing techniques described herein, using selected electrode modules 608 of an existing electro-remediation field 610 as well as additional electrode modules 612 provided for the purposes of forming barrier 602. In this case, example barriers 602 and 607 are not linear in arrangement.

Example barriers 604, 606 and 607 of system 600 may have been formed, employing techniques described herein, using selected electrode modules of existing electro-remediation field 610. Barriers 604 and 606, as shown in this example arranged adjacent to each other, may act to provide additional containment of plume 605. In this case, barriers 604 and 606 are linear in arrangement. Further, example barrier 607 intersects barriers 604 and 606 and employs some electrode modules of field 610 in common with barriers 604 and 606. While FIG. 6 illustrates several example barrier configurations such example configurations are non-limiting and permeation barriers in accordance with the present disclosure may take any configuration having any shape including open configurations such as lines, linear or otherwise, as well as closed configurations such as rectangular configurations, circular configurations, etc. For example, additional barrier segments 609 and 611 may be combined with barriers 602 and 604 to provide a closed circular-shaped barrier configuration surrounding plume 605.

Figure 7:
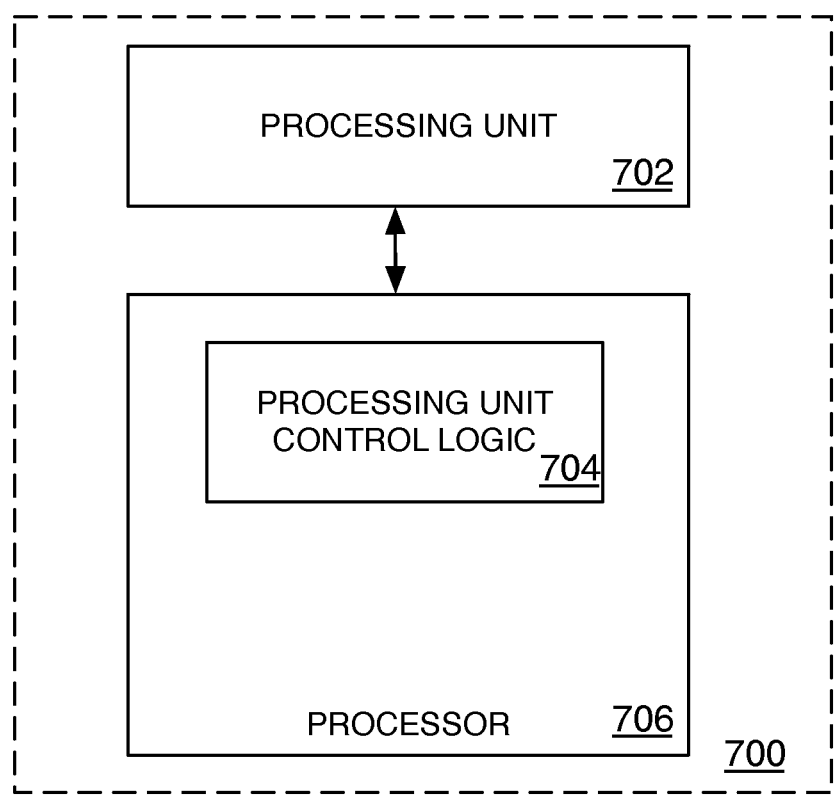
FIG. 7 is an illustrative diagram of an example system for implementing at least portions of the processes of FIGS. 4 and 5.

FIG. 7 illustrates an example system 700 for providing and/or implementing pollution control systems in accordance with at least some implementations of the present disclosure. System 700 may include a processing unit 702 operably coupled to a processor 706 that may include processing unit control logic 704. Processing unit 702 may include any arrangement of devices or subsystems configured to undertake the manufacture of systems such as those illustrated in FIGS. 1 and 6 using, for example, processes 400 and/or 500.

Processing unit control logic 704 may be configured to provide functional control of any arrangement of devices or subsystems and may include hardware, software or firmware logic and/or any combination thereof although claimed subject matter is not limited to specific types or manifestations of processing unit control logic. Processor 706 may be a microprocessor or Central Processing Unit (CPU). In other implementations, processor 706 may be an Application Specific Integrated Circuit (ASIC), a Field Programmable Gate Array (FPGA), a digital signal processor (DSP), or other integrated formats. Processor 706 and processing unit 702 may be configured to communicate by any suitable means, such as, for example, by wired connections or wireless connections.

FIG. 8 illustrates an example computer program product 800 arranged in accordance with at least some examples of the present disclosure. Program product 800 may include a signal bearing medium 802. Signal bearing medium 802 may include one or more instructions 804 that, when executed by, for example, a processor, may provide the functionality described above with respect to FIGS. 4 and 5. Thus, for example, referring to the system of FIG. 7, one or more of control logic 704 and/or processor 706 may undertake one or more of the blocks shown in FIGS. 4 and 5 in response to instructions 804 conveyed by medium 802.

In some implementations, signal bearing medium 802 may encompass a computer-readable medium 806, such as, but not limited to, a hard disk drive, a Compact Disc (CD), a Digital Versatile Disk (DVD), a digital tape, memory, etc. In some implementations, signal bearing medium 802 may encompass a recordable medium 808, such as, but not limited to, memory, read/write (R/W) CDs, R/W DVDs, etc. In some implementations, signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, referring to the system of FIG. 7, program product 800 may be wirelessly conveyed to processing unit 702 by signal bearing medium 802, where signal bearing medium 802 is conveyed to processing unit 702 by a wireless communications medium 810 (e.g., an wireless communications medium conforming with the 802.11 standard).

Figure 9:
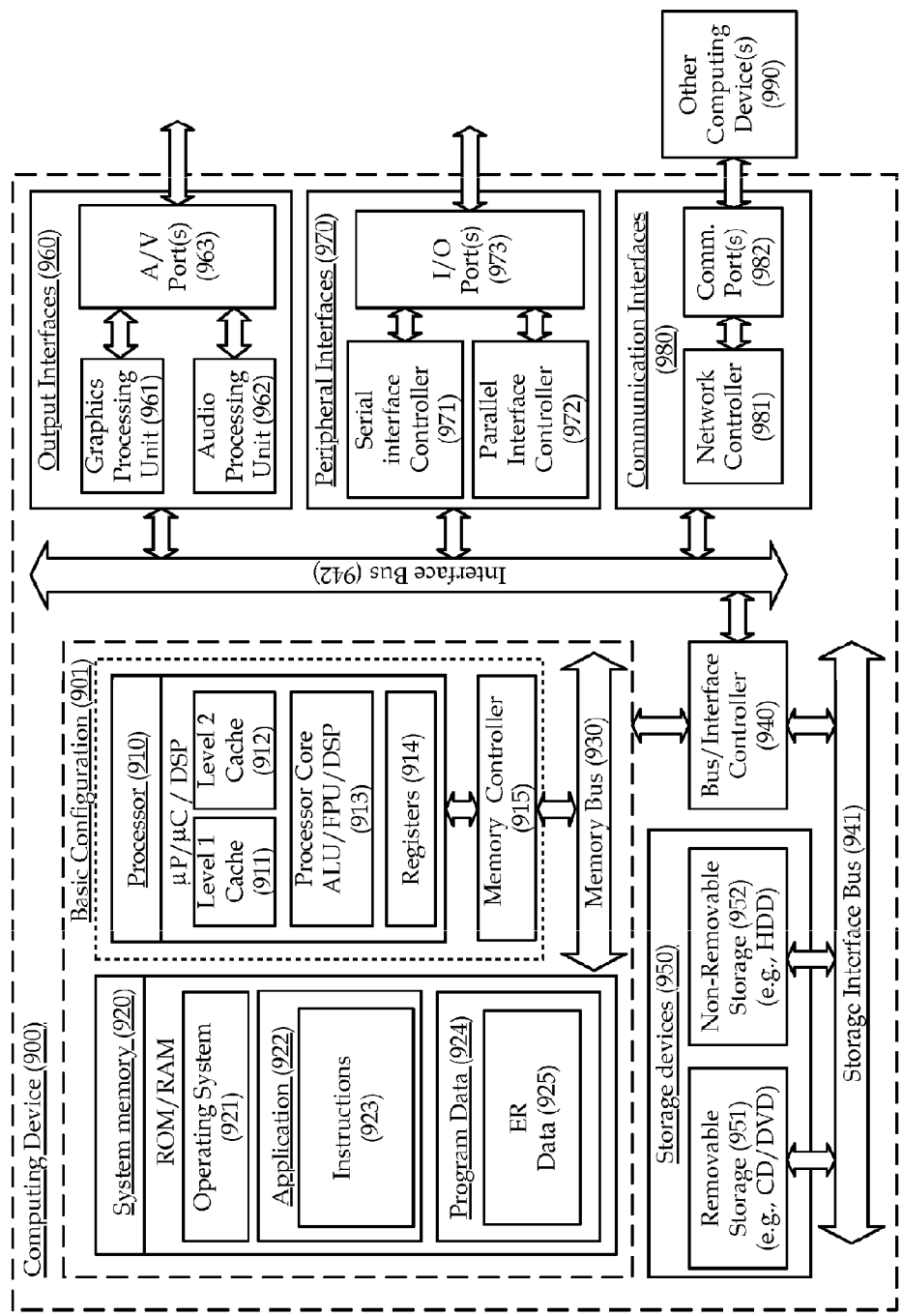
FIG. 9 is an illustration of an example computing device, all arranged in accordance with at least some embodiments of the present disclosure.

FIG. 9 is a block diagram illustrating an example computing device 900 in accordance with various implementations of the present disclosure. In a very basic configuration 901, computing device 900 typically includes one or more processors 910 and system memory 920. A memory bus 930 can be used for communicating between the processor 910 and the system memory 920.

Depending on the desired configuration, the system memory 920 can be of any type including but not limited to volatile memory (such as RAM), non-volatile memory (such as ROM, flash memory, etc.) or any combination thereof. System memory 920 typically includes an operating system 921, one or more applications 922, and program data 924. Application 922 may include instructions 923 that are arranged to perform the functions as described herein including the actions described with respect to the flow charts shown in FIGS. 4 and 5. Program Data 924 may include electro-remediation (ER) data 925, such as voltages, voltage pulsing schemes etc. that may be useful for implementing instructions 923. In some examples, application 922 can be arranged to operate with program data 924 on an operating system 921 such that implementations of the present disclosure, as described herein, may be provided. This described basic configuration is illustrated in FIG. 9 by those components within dashed line 901.

Computing device 900 can have additional features or functionality, and additional interfaces to facilitate communications between the basic configuration 901 and any required devices and interfaces. For example, a bus/interface controller 940 can be used to facilitate communications between the basic configuration 901 and one or more data storage devices 950 via a storage interface bus 941. The data storage devices 950 can be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media can be part of device 900.

Computing device 900 can also include an interface bus 942 for facilitating communication from various interface devices (e.g., output interfaces, peripheral interfaces, and communication interfaces) to the basic configuration 901 via the bus/interface controller 940. Example output interfaces 960 include a graphics processing unit 961 and an audio processing unit 962, which can be configured to communicate to various external devices such as a display or speakers via one or more A/V ports 963. Example peripheral interfaces 970 include a serial interface controller 971 or a parallel interface controller 972, which can be configured to communicate with external devices such as input devices (e.g., keyboard, mouse, pen, voice input device, touch input device, etc.) or other peripheral devices (e.g., printer, scanner, etc.) via one or more I/O ports 973. An example communication interface 980 includes a network controller 981, which can be arranged to facilitate communications with one or more other computing devices 990 over a network communication via one or more communication ports 982. A network communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 900 can be implemented as a portion of a small-form factor portable (or mobile) electronic device such as a cell phone, smart phone, a personal data assistant (PDA), a personal media player device, a wireless web-watch device, a personal headset device, an application specific device, or a hybrid device that include any of the above functions. Computing device 900 can also be implemented as a personal computer including both laptop computer and non-laptop computer configurations or implemented in a workstation or a server configuration.

References made in this disclosure to the term "responsive to" or "in response to" are not limited to responsiveness to only a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It should also be understood that, the term "optimize" may include maximization and/or minimization. The term "minimization" and/or the like as used herein may include a global minimum, a local minimum, an approximate global minimum, and/or an approximate local minimum. Likewise, it should also be understood that, the term "maximization" and/or the like as used herein may include a global maximum, a local maximum, an approximate global maximum, and/or an approximate local maximum.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method to form a subsurface permeation barrier, the method comprising:
    initially providing a surfactant material including at least one of a high pH surfactant solution and a buffered surfactant solution to a subsurface soil volume;
    providing at least one of a cathode electrode or an anode electrode adjacent to the surfactant material;
    placing the at least one of the cathode electrode or the anode electrode at a particular distance away from another cathode electrode or another anode electrode adjacent to the at least one of the cathode electrode or the anode electrode, wherein the particular distance is determined based on a permeation rate corresponding to at least one from a set of: a soil type, a soil density, and a pore size associated with the subsurface soil volume;
    permeating one or more portions of the subsurface soil volume with the surfactant material;
    providing an acidifying material including at least one of a low pH solution and an unbuffered solution adjacent to the at least one of the cathode electrode or the anode electrode; and
    permeating the one or more portions of the subsurface soil volume permeated by the surfactant material with the acidifying material such that the surfactant material adheres to soil particles in the subsurface soil volume in order to form the subsurface permeation barrier.

2. The method of claim 1, wherein the subsurface permeation barrier is configured to inhibit permeation of another material through the subsurface soil volume.

3. The method of claim 1, wherein providing surfactant material to the subsurface soil volume comprises:

configuring the at least one of the cathode electrode and the anode electrode to facilitate permeation of the surfactant material within the subsurface soil volume; and casing the surfactant material to permeate at least a portion of the subsurface soil volume.

4. The method of claim 1, wherein the surfactant material comprises at least one of: polysiloxane, hydroxypropyl beta cyclodextrin, polysorbate 80, trimethylammonium bromide, cetyltrimethylammonium bromide, tetradecyltrimethylammonium bromide, octadecyltrimethylammonium bromide, polyacrylamide, methyl cellulose, dioctyl sulfonate, diphenyl oxide disulfonate, polyoxyalkylated fatty acid ester, sodium dodecyl sulfate, trehalolipids, rhamnolipids, sophorolipids, glycolipids, diglycosyl diglycerides, surfactin, liposan, or emulsan.

5. The method of claim 1, further comprising selecting the surfactant material to at least partially block soil pores in the subsurface permeation barrier.

6. A method to form a subsurface permeation barrier, the method comprising:

initially providing a surfactant material including at least one of a high pH surfactant solution and a buffered surfactant solution adjacent to at least one of a cathode electrode or an anode electrode, wherein the at least one of the cathode electrode or the anode electrode are configured to facilitate permeation of a surfactant material within a subsurface soil volume;

placing the at least one of the cathode electrode or the anode electrode at a particular distance away from another cathode electrode or another anode electrode adjacent to the at least one of the cathode electrode or the anode electrode, wherein the particular distance is determined based on a permeation rate corresponding to at least one from a set of: a soil type, a soil density, and a pore size associated with the subsurface soil volume;

permeating one or more portions of the subsurface soil volume with the surfactant material by applying direct current (DC) voltage pulses over the at least one of the cathode electrode or the anode electrode providing at least one of a low pH acidifying material and an unbuffered acidifying material adjacent to the at least one of the cathode electrode or the anode electrode; and permeating the one or portions of the subsurface soil volume permeated by the surfactant material with the at least one of the low pH acidifying material and the unbuffered acidifying material such that the surfactant material adheres to soil particles within the subsurface soil volume to form the subsurface permeation barrier.

7. The method of claim 6, wherein the surfactant material comprises at least one of polysiloxane, hydroxypropyl beta cyclodextrin, polysorbate 80, trimethylammonium bromide, cetyltrimethylammonium bromide, tetradecyltrimethylammonium bromide, octadecyltrimethylammonium bromide, polyacrylamide, methyl cellulose, dioctyl sulfonate, diphenyl oxide disulfonate, polyoxyalkaylated fatty acid ester, sodium dodecyl sulfate, trehalolipids, rhamnolipids, sophorolipids, glycolipids, diglycosyl diglycerides, surfactin, liposan, or emulsan.

8. The method of claim 6, further comprising selecting the surfactant material to at least partially block soil pores within the soil volume to prevent permeation of another material through the subsurface soil volume.

9. The method of claim 6, wherein the acidifying material comprises at least one of an un-buffered surfactant solution, an acidic surfactant solution, and acidified water solution, or water.

* * * * *